US009305270B2

(12) United States Patent
Springborn et al.

(10) Patent No.: US 9,305,270 B2
(45) Date of Patent: Apr. 5, 2016

(54) SYNCHRONIZATION OF RECIPE STRUCTURES AND BILL OF MATERIALS INCLUDING THE ADJUSTMENT TO MANUFACTURING REQUIREMENTS

(75) Inventors: Steffen Springborn, Edingen-Neckarhausen (DE); Kai-Martin Schroeder, Wiesloch (DE); Gregor Rieken, Walldorf (DE); Stephan Toebben, Walldorf (DE)

(73) Assignee: SAP SE, Walldorf (DE)

( * ) Notice: Subject to any disclaimer, the term of this patent is extended or adjusted under 35 U.S.C. 154(b) by 1668 days.

(21) Appl. No.: 12/639,757

(22) Filed: Dec. 16, 2009

(65) Prior Publication Data

US 2011/0144789 A1 Jun. 16, 2011

(51) Int. Cl.
*G06Q 10/06* (2012.01)
*G06N 99/00* (2010.01)

(52) U.S. Cl.
CPC ............... *G06Q 10/06* (2013.01); *G06N 99/00* (2013.01)

(58) Field of Classification Search
CPC ..... G06Q 10/06; G06Q 10/087; G06N 99/00; G06N 99/005; G06F 17/50
USPC ........................................... 700/107; 706/62
See application file for complete search history.

(56) References Cited

U.S. PATENT DOCUMENTS

| | | | |
|---|---|---|---|
| 5,315,709 A | 5/1994 | Alston, Jr. et al. | |
| 6,223,187 B1 | 4/2001 | Boothby et al. | |
| 6,678,882 B1 | 1/2004 | Hurley et al. | |
| 6,795,868 B1 | 9/2004 | Dingman et al. | |
| 7,610,317 B2 | 10/2009 | Rao et al. | |
| 7,756,882 B2 | 7/2010 | Aharoni et al. | |
| 7,870,016 B2 | 1/2011 | Fazal et al. | |
| 7,934,207 B2 | 4/2011 | Gustafsson et al. | |
| 7,958,031 B2 | 6/2011 | Hunt et al. | |
| 8,006,223 B2 | 8/2011 | Boulineau et al. | |
| 2003/0182461 A1 | 9/2003 | Stelting et al. | |
| 2003/0233249 A1 | 12/2003 | Walsh et al. | |
| 2004/0225677 A1 | 11/2004 | Rangadass | |
| 2004/0243453 A1 | 12/2004 | Call et al. | |
| 2005/0050068 A1 | 3/2005 | Vaschillo et al. | |
| 2005/0137725 A1* | 6/2005 | Scholl et al. ..................... | 700/83 |
| 2006/0004831 A1 | 1/2006 | Debertin et al. | |
| 2006/0004854 A1 | 1/2006 | Okunseinde et al. | |
| 2006/0072505 A1 | 4/2006 | Carrillo et al. | |
| 2006/0161879 A1 | 7/2006 | Lubrecht et al. | |
| 2008/0183524 A1 | 7/2008 | Suresh et al. | |

OTHER PUBLICATIONS

'The role of the bill of materials as a CAD/CAPM interface and the key importance of engineering change control': Maull, 1992, Computing & control engineering journal, pp. 63-70.*
'A procedure oriented generic bill of materials': Olsen, 1997, Computers and Engineering vol. 32, No. 1, pp. 29-45.*

(Continued)

*Primary Examiner* — Kakali Chaki
*Assistant Examiner* — Peter Coughlan
(74) *Attorney, Agent, or Firm* — Dilworth IP LLC

(57) ABSTRACT

A system and method of synchronizing recipes and bills of materials (BOM). An approved recipe is parameterized in a planning interface. A BOM is synchronized with the parameterized recipe. The BOM is then displayed in a graphical user interface to allow a user to modify by a resolve conflict present during synchronization.

4 Claims, 2 Drawing Sheets

(56) References Cited

OTHER PUBLICATIONS

'Automatic generation of a bill of materials based on attribute patterns with variant specification in a customer oriented environment': Matias, 2008, JOurnal of materials processing technology 199, pp. 431-436.*

Non Final Office Action mailed Sep. 23, 2011, U.S. Appl. No. 12/639,772.

SAP AG, Final Office Action mailed Apr. 24, 2012; U.S. Appl. No. 12/639,772.

* cited by examiner

SYNCHRONIZATION OF RECIPE STRUCTURES AND BILL OF MATERIALS INCLUDING THE ADJUSTMENT TO MANUFACTURING REQUIREMENTS

BACKGROUND OF THE INVENTION

1. Field

Embodiments of the invention relate to hand off of recipes to manufacturing. More specifically, embodiments of the invention relate to synchronization of recipes to bills of materials.

2. Background

In process industries, research and development uses recipes to describe products. As used herein, "recipe" refers to a listing of ingredients and process step required to combine the ingredients into a finished product. Commonly, food products, chemical compositions and such are the result of a recipe. A recipe contains all the ingredients that are necessary for a product. Recipes tend to focus on calculation of physical and chemical properties, such as the chemical bonding properties, density, diet, nutrients, etc. Recipes also tend to be concerned with ratios of ingredients rather than absolute amounts. This type of structure is not suitable for manufacturing. Instead, a bill of materials that contains all of the data necessary for manufacturing is used. While the source of the bill of materials may be a recipe, a part of a recipe or a set of recipes, manufacturing must create a bill of materials out of that source.

Moreover, if the source recipe or recipes changes, for example, as a result of modification in research and development, manufacturing must be able to synchronize the changes into the bill of materials. This process is complicated by the fact that all data necessary for manufacturing is not necessarily present in the recipe. Additionally, the quantities of the recipe must be scaled consistent with the constraints of the production facility. It is also possible that one or more materials specified may not be available at a particular production site such that an alternative material must be used. An efficient way to synchronize recipe changes with bill of materials is desirable.

SUMMARY

A system and method of synchronizing recipes and bills of materials (BOM) is disclosed. An approved recipe is parameterized in a planning interface. A BOM is synchronized with the parameterized recipe. The BOM is then displayed in a graphical user interface to allow a user to modify by a resolve conflict present during synchronization.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
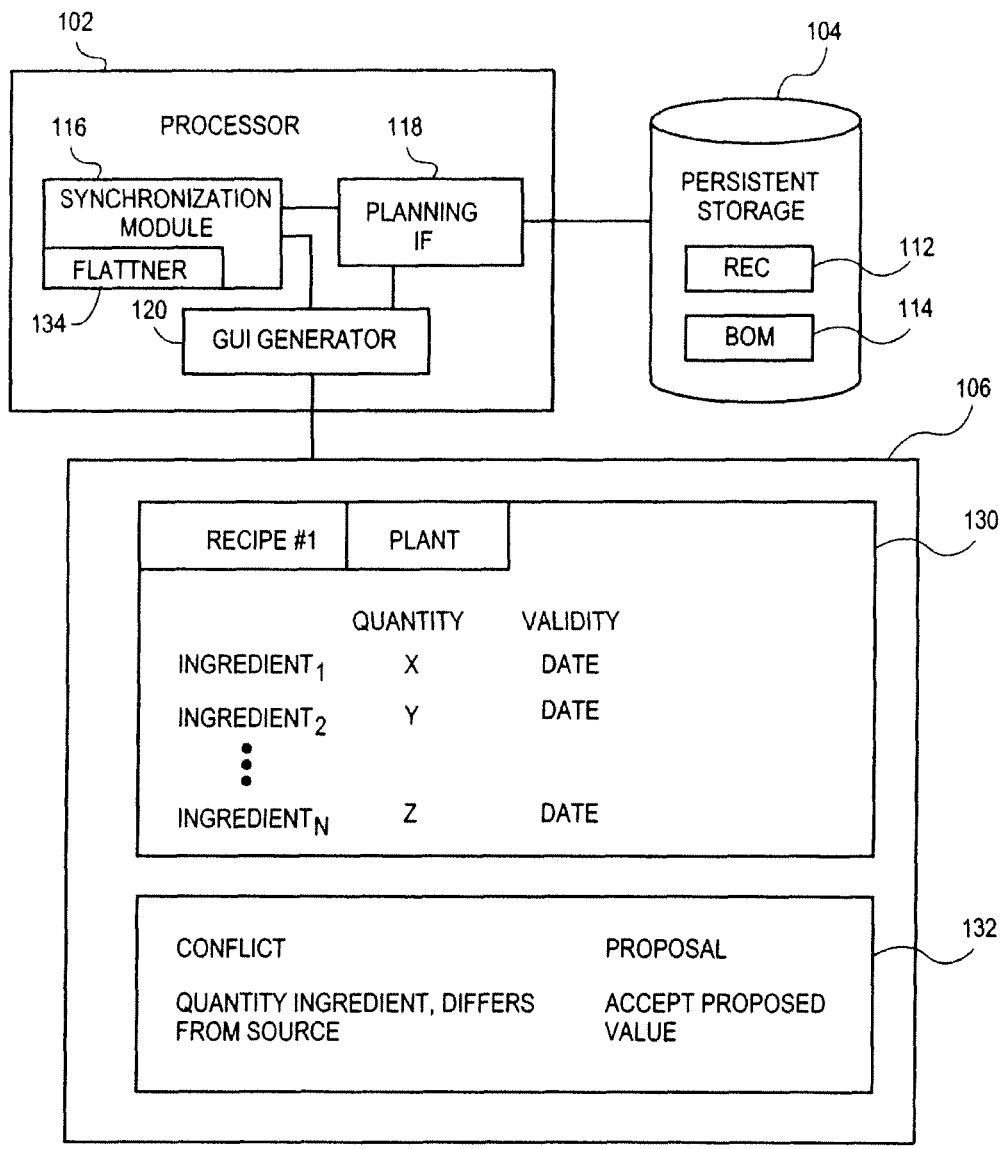
FIG. 1 is a block diagram of a system of one embodiment of the invention.

FIG. 1 is a block diagram of a system of one embodiment of the invention. A processor 102 is coupled to a persistent storage 104 and a display 106. Persistent storage unit 104, which may be a database, includes a recipe repository 112 and a bill of materials (BOM) repository 114. In one embodiment, bills of materials in the repository include a link to the corresponding recipe(s) and a synchronization flag. The recipes have a link to associated BOMs such that responsive to a recipe change being committed to the recipe repository 112 all associate BOM are flagged as out of synchronization. This insures that manufacturing is using a most current recipe as the BOM must be flagged synchronized before manufacturing can commence.

Processor 102 includes a planning interface 118 that may be used to parameterize a recipe from recipe repository 112. In some embodiments, parameterizing recipe may include associating the recipe with a production facility, such as a plant. Production facility specific manufacturing values may be propagated through the recipe. For example, if the plant has the capacity to make batches of the recipe one ton at a time, the batch size may dictate, for example, scale factor for the recipe. Planning interface 118 also permits selection between alternative materials as part of the parameterization. The parameterized recipe may be passed to the synchronization module 116 executing on the processor which will permit synchronization of a BOM based on the source parameterized recipe. The parameterization may be stored in the persistent storage 104 and automatically applied when subsequent recipe changes are sent for synchronization. Generally, synchronization module 116 creates an intermediate structure for BOM and compares it to a target BOM from BOM repository 114 to evaluate if conflicts exist.

Graphical user interface (GUI) generator 120 causes display 106 to display an intermediate representation of the BOM 130 as well as a conflicts list 132, which may include proposals for resolutions of the conflicts. For example, if a change in Ingredient, as a result, for example, a reformulation in research and development occurs, a comparison of the BOM corresponding to the change recipe with the BOM corresponding to the previously unchanged recipe may yield a quantity conflict indicating that the quantity of Ingredient, (in the target) differs from the source, e.g., the changed recipe. The proposed resolution then may be to accept the quantity of the source as the value in the newly synchronized BOM. A user may accept the proposal by, for example, clicking on a soft button associated with the proposal. Alternatively, the user may reject the proposal and provide their own solution. In some embodiments, the system may retain an accepted resolution and apply that resolution in the event of a subsequent recipe change (either automatically or subject to user approval depending on system settings).

Some recipes may be multi-level. For example, a cake may be thought of in some cases as having three sub-recipes: the cake, icing and possibly some filling. Often, production facilities require a single BOM for a finished product. To facilitate the synchronization of multi-level recipes, synchronization module may include a flattener 134, which aggregates the multiple levels of a recipe into a single flat BOM presentation. In other embodiments, the synchronization module 116 may move through the levels of the recipe iteratively synchronizing each level to its own BOM. For example, a recipe may include sub recipes that are distinct recipes for e.g. an ingredient of the main recipe. In some embodiments, the ingredient recipes will first be synchronized each to their own BOM and then the Parent recipe (that uses the ingredient may then be synchronized to its BOM.

Figure 2:
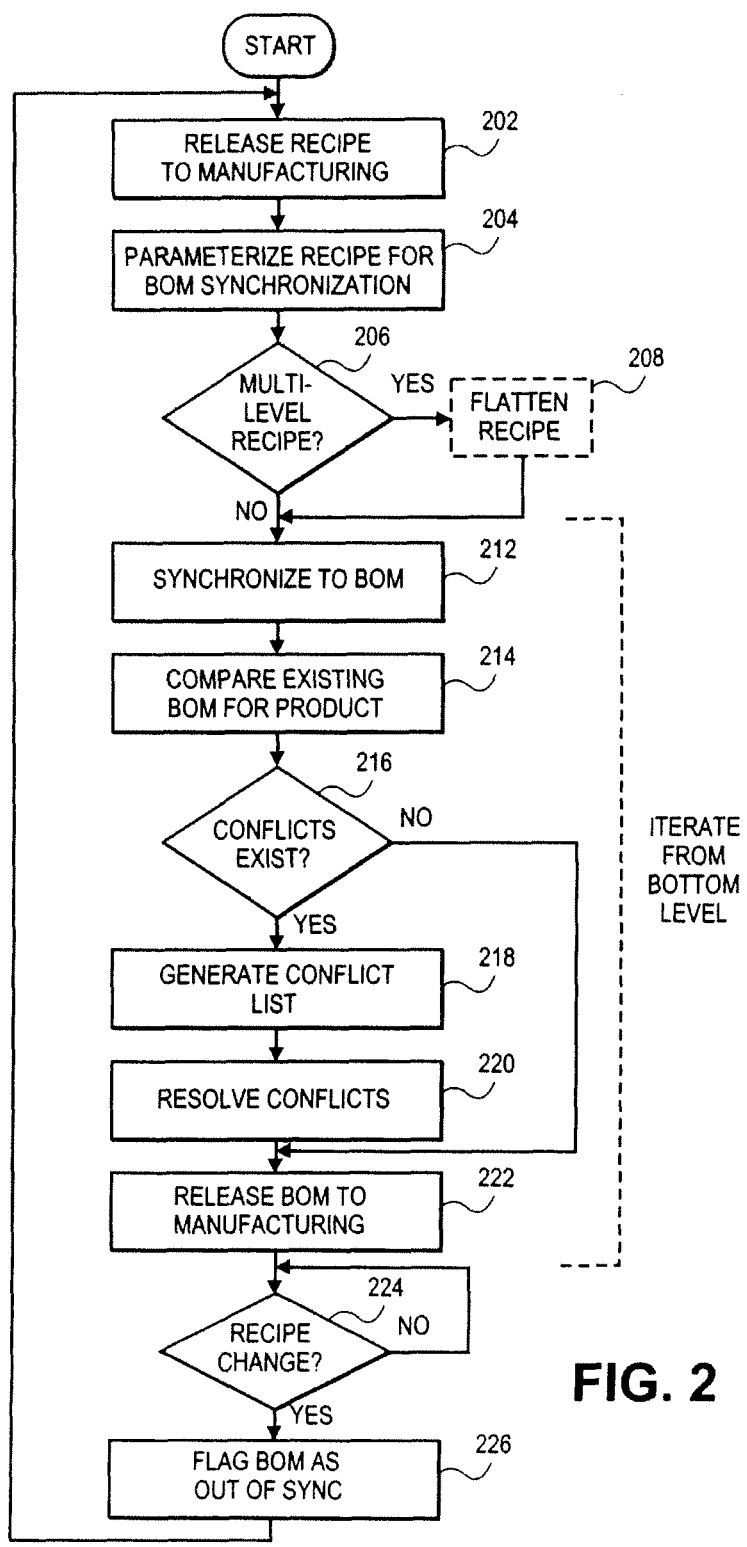
FIG. 2 is a flow diagram of operation in one embodiment of the invention.

FIG. 2 is a flow diagram of operation in one embodiment of the invention. At block 202, a recipe is released to manufacturing. After release, either development can push the recipe synchronization or manufacturing may be simply notified of the release for example via a work flow and then can pull the recipe into the BOM. Both push and pull mode follow the same flow described below with the difference being which department is driving the synchronization. At block 204, the recipe is parameterized for synchronization to a BOM. A determination is made at decision block 206 whether the recipe is multi-level. If the recipe is multi-level in some embodiments the recipe is flattened at block 208. In other embodiments, rather than flattening the recipe, the system iteratively synchronizes the recipe from the bottom level up and creates a distinct BOM for each level. This constitutes a level by level application of blocks 212-222 described below.

At block 212, the recipe is synchronized to a BOM. Then a comparison is performed with a BOM existing for the product at block 214. A determination is made at block 216 whether any conflicts exist. In the case of a new recipe, no conflicts are likely to exist since there is no preexisting BOM to be in conflict. However, if conflicts exist, a list of conflicts is generated at block 218. In one embodiment, some conflicts may be automatically resolved based on how such conflicts were handled in prior synchronizations. In other embodiments, the conflict list and proposals for conflict resolution are presented to a user on an electronic display. At block 220, the conflicts are resolved. This may either take the form of automatic resolution as mentioned above, or user selection of possible resolutions for the conflict. Once all conflicts are resolved at block 220, the synchronized BOM may be released for manufacturing.

At block 224, a determination is made whether there has been a change in the recipe associated with the previously synchronized BOM. As long as no recipe change occurs, no further synchronization of that BOM is required. However, in the event a recipe change occurs, the BOM is flagged as out of synchronization. Then the change recipe is released to manufacturing in block 202 and the change recipe may be synchronized through the system.

While embodiments of the invention are discussed above in the context of flow diagrams reflecting a particular linear order, this is for convenience only. In some cases, various operations may be performed in a different order than shown or various operations may occur in parallel. It should also be recognized that some operations described with respect to one embodiment may be advantageously incorporated into another embodiment. Such incorporation is expressly contemplated.

Elements of embodiments of the present invention may also be provided as a machine-readable medium for storing the machine-executable instructions. The machine-readable medium may include, but is not limited to, flash memory, optical disks, compact disks read only memory (CD-ROM), digital versatile/video disks (DVD) ROM, random access memory (RAM), erasable programmable read-only memory (EPROM), electrically erasable programmable read-only memory (EEPROM), magnetic or optical cards.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:

parameterizing an approved recipe in a planning interface of a computer;

synchronizing a bill of materials (BOM) with the approved recipe based at least in part on the parameterization;

displaying the BOM in a graphical user interface permitting user modification of the BOM; and marking the BOM as not synchronized responsive to a change of the recipe.

2. The method of claim 1 further comprising:

automatically applying the parameterization to the changed recipe in synchronizing the changed recipe.

3. A non-transitory computer readable medium containing instructions that when executed by a processor cause the processor to:

parameterize an approved recipe in a planning interface of a computer;

synchronize a bill of materials (BOM) with the approved recipe based at least in part on the parameterization;

display the BOM in a graphical user interface permitting user modification of the BOM; and mark the BOM as not synchronized responsive to a change of the recipe.

4. The computer readable medium of claim 3 further containing instructions causing the processor to:

synchronize the changed recipe; and automatically apply the parameterization to the changed recipe in synchronizing the changed recipe.

* * * * *